United States Patent
Albrecht et al.

(10) Patent No.: US 11,396,235 B2
(45) Date of Patent: Jul. 26, 2022

(54) TRACTION NETWORK AND METHOD FOR OPERATING A TRACTION NETWORK OF AN ELECTRICALLY-DRIVEN TRANSPORTATION VEHICLE IN THE EVENT OF A SHORT CIRCUIT

(71) Applicant: VOLKSWAGEN AKTIENGESELLSCHAFT, Wolfsburg (DE)

(72) Inventors: Fabian Albrecht, Braunschweig (DE); Marcus Sommerfeld, Braunschweig (DE)

(73) Assignee: VOLKSWAGEN AKTIENGESELLSCHAFT

(*) Notice: Subject to any disclaimer, the term of this patent is extended or adjusted under 35 U.S.C. 154(b) by 82 days.

(21) Appl. No.: 16/521,617

(22) Filed: Jul. 25, 2019

(65) Prior Publication Data
US 2020/0031240 A1    Jan. 30, 2020

(30) Foreign Application Priority Data
Jul. 25, 2018    (DE) ..................... 10 2018 212 405.1

(51) Int. Cl.
*H02J 4/00*    (2006.01)
*B60L 50/50*    (2019.01)

(52) U.S. Cl.
CPC ............... *B60L 50/50* (2019.02); *H02J 4/00* (2013.01)

(58) Field of Classification Search
CPC ...... B60L 50/50; B60L 3/0061; B60L 3/0023; B60L 3/003; B60L 3/04; B60L 2200/46;
(Continued)

(56) References Cited

U.S. PATENT DOCUMENTS 5,808,371 A * 9/1998 Kon'i ................. B60G 17/0185
                                                           307/10.1
9,673,695 B1 * 6/2017 Li ............................. H02M 1/32
(Continued)

FOREIGN PATENT DOCUMENTS

DE    102007048620 A1    4/2008
DE    102010056006 A1 *  6/2012 ........... G01R 31/006
(Continued)

OTHER PUBLICATIONS

Lepretre, "Ensure Short Circuit Withstand Strength in Low Voltage Electric Switchboards", pp. 1-4, Jun. 28, 2018 (Year: 2018).*

*Primary Examiner* — Pinping Sun
(74) *Attorney, Agent, or Firm* — Barnes & Thornburg, LLP

(57) ABSTRACT

A method for operating a traction power supply system of an electrically-driven transportation vehicle in response to a short circuit, wherein the traction power supply system includes a voltage source and at least two electric drive units connected to the voltage source via respective electrical distribution paths, and wherein at least one electrical isolating element for selective isolation of the voltage source is arranged in the distribution path of each drive unit, wherein, in response to a short circuit in the traction power supply system being detected, the method includes detecting in which distribution path and/or in which drive unit the short circuit is present; operating the traction power supply system in a ready-to-drive state, wherein only that drive unit in which or in the distribution path of which the short circuit is present is isolated from the voltage source.

18 Claims, 2 Drawing Sheets

(58) Field of Classification Search
CPC .............. B60L 2260/28; B60L 2200/42; B60L 2200/44; B60L 3/0046; H02J 4/00; Y02T 10/70; Y02P 90/60
See application file for complete search history.

(56) References Cited

U.S. PATENT DOCUMENTS

| | | | | |
|---|---|---|---|---|
| 2008/0074939 | A1* | 3/2008 | Mori | G11C 29/83 365/205 |
| 2009/0109590 | A1* | 4/2009 | Girot | H03K 17/122 361/93.8 |
| 2010/0195417 | A1* | 8/2010 | Ogasawara | G11C 11/4091 365/189.11 |
| 2011/0221404 | A1* | 9/2011 | Rozman | H02J 1/08 323/234 |
| 2011/0317321 | A1* | 12/2011 | Vogel | H02H 3/025 361/87 |
| 2013/0175857 | A1* | 7/2013 | Shreevani | B60L 3/0069 307/9.1 |
| 2016/0172851 | A1* | 6/2016 | Wendt | G01R 31/68 307/113 |
| 2017/0080883 | A1* | 3/2017 | Yasunori | H02J 7/0063 |
| 2018/0001850 | A1* | 1/2018 | Kontani | H02J 1/10 |
| 2018/0138695 | A1* | 5/2018 | Wu | H01H 9/542 |
| 2018/0186248 | A1* | 7/2018 | Juhl | B60L 3/04 |
| 2018/0238935 | A1* | 8/2018 | Nakashima | G01R 31/3278 |
| 2020/0014240 | A1* | 1/2020 | Boesch | B60R 16/03 |

FOREIGN PATENT DOCUMENTS

| | | | |
|---|---|---|---|
| DE | 102010056006 A1 | 6/2012 | |
| DE | 102012018321 A1 | 3/2013 | |
| DE | 102012008626 A1 * | 10/2013 | ............ B60L 3/0069 |
| DE | 102016106661 A1 | 10/2017 | |
| EP | 2733843 A1 | 5/2014 | |
| EP | 3000646 A1 | 3/2016 | |

* cited by examiner

TRACTION NETWORK AND METHOD FOR OPERATING A TRACTION NETWORK OF AN ELECTRICALLY-DRIVEN TRANSPORTATION VEHICLE IN THE EVENT OF A SHORT CIRCUIT

PRIORITY CLAIM

This patent application claims priority to German Patent Application No. 10 2018 212 405.1, filed 25 Jul. 2018, the disclosure of which is incorporated herein by reference in its entirety.

SUMMARY

Illustrative embodiments relate to a traction power supply system and method for operating a traction power supply system of an electrically driven transportation vehicle in the event of a short circuit.

BRIEF DESCRIPTION OF THE DRAWINGS

In the following text, disclosed embodiments are explained based on the appended schematic figures. Features that correspond in terms of their type and/or function can in this case be provided with the same reference signs across all of the figures. In the figures.

DETAILED DESCRIPTION

Figure 1:
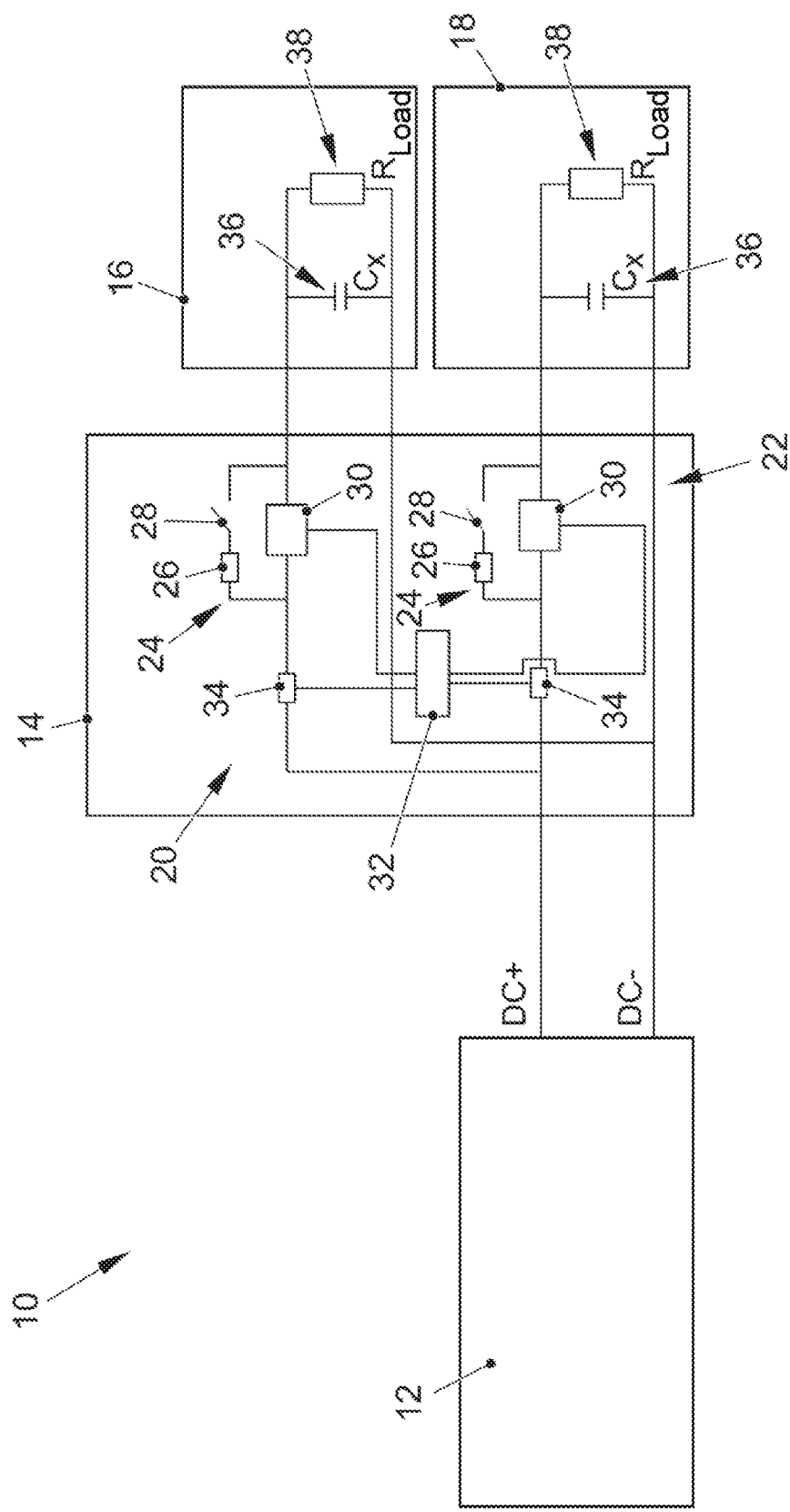
FIG. 1 shows a schematic illustration of a traction power supply system in accordance with a first exemplary embodiment, which executes a disclosed method in accordance with a first embodiment.

In electrically driven transportation vehicles, it is known to generate a forward-movement force or else traction force by way of a multiplicity of redundant electrical drive units. The drive units can in each case comprise at least one electric machine for generating the traction force and the constituent part of a traction power supply system (or else traction electricity supply system) of the transportation vehicle. Providing a corresponding multiplicity of drive units makes it possible that, in the event of a fault of one of the drive units, at least a part of the traction force provided before the fault case can be provided by the further drive unit. Depending on the desired level of safety, the transportation vehicle can in this case continue to be operated over a certain minimum period, for example, to be able to bring the transportation vehicle to a standstill in a breakdown lane or a comparable location outside of the regular traffic flow. However, particularly for autonomously driving transportation vehicles (that is to say transportation vehicles driving without human influences or with only very limited human influences), it may be desirable for the transportation itself to be capable of reaching the target of a prescribed driving route itself in the case of the fault of one of the drive units.

A typical fault case relates to a short circuit in one of the drive units and/or in a distribution path between a voltage source and a drive unit. Until now it has not been possible with a sufficient degree of reliability, in the case of a short circuit in one of the drive units (or the associated distribution path of the drive unit), to ensure to a sufficient degree of reliability that the generation of a desired traction force is possible by way of the still remaining (not faulty) drive unit with a sufficient degree of reliability. Instead, in previously envisaged systems, cases in which a short circuit in one of the drive units (and/or in the associated distribution paths) leads to a total failure of the entire traction power supply system, with the result that the transportation vehicle comes to a standstill comparatively quickly, can even arise.

Disclosed embodiments improve the reliability of a traction power supply system for electrically driven transportation vehicles, in particular, with respect to the occurrence of short-circuits and also, in particular, in a plurality of drive units in the traction power supply system that are able to be operated redundantly.

This is achieved by a method and a traction power supply system. It also goes without saying that, unless otherwise specified or evident, the features mentioned in the introductory description may also be provided individually or in any desired combination.

A basic idea of the disclosure consists in carrying out a more precise detection of the location of the short circuit and then continuing to operate the traction power supply system to generate a traction force as far as possible, instead of identifying a short circuit and the controlled electrical disconnection of the drive units or else of the entire traction power supply system. Provision is made for only that region of the traction power supply system that is affected by the short circuit to be electrically disconnected and/or electrically isolated. A still operational area or portion of the traction power supply system should, in contrast, continue to be operated to generate a traction force. In this case, in particular, a drive unit of a multiplicity of drive units that is affected by the short circuit and/or an electrical distribution path, that connects one of the drive units, for example, to a voltage source is considered to be the short circuit location.

In detail, a method for operating a traction power supply system of an electrically driven transportation vehicle (or an electrically driven transportation vehicle and, in particular, an electrically driven passenger transportation vehicle) in the event of a short circuit is proposed wherein the traction power supply system comprises a voltage source (for example, a battery) and at least two electric drive units (for example, each comprising at least one electric machine for generating a traction force) connected to the voltage source via respective electrical distribution paths, wherein at least one electrical isolating element for selective (that is to say selectively activatable) isolation of the voltage source is arranged in the distribution path of each drive unit, wherein, when a short circuit in the electricity supply system is detected, the method comprises detecting in which distribution path and/or in which drive unit the short circuit is present; and operating the electricity supply system in a ready-to-drive state, wherein only that drive unit in which or in the distribution paths of which the short circuit is present is isolated from the voltage source.

The voltage source may be, in particular, a high-voltage battery. Each drive unit can be connected to the voltage source via at least one separate electrical distribution path. However, the electrical distribution paths can themselves be connected to one another at least indirectly, for example, when they are connected to common poles of the voltage source. A distribution path can generally be provided by an electrical line and/or an electrical conductor.

The drive units can each comprise at least one electrical drive machine and electrical components required for the operation of the drive machine. In this case, the electrical components may be, for example, power converters and/or auxiliary loads, such as, for example, a cooling or air-conditioning system for the at least one drive machine. In general, the drive units can be of identical form to one another. Each drive unit can also comprise at least one capacitance. The capacitance can be formed by capacitances of different components and component parts of a respective drive or can be composed thereof (for example, by the capacitance of a power converter and, in particular, of a DC voltage converter). In the following text, reference is therefore also made to a capacitance, a capacitor capacitance and/or any capacitor discharge systems of the drive units.

The distribution paths can be a constituent part of an electrical distributor. The latter can be positioned or connected between the voltage source and the drives and electrically connect these to one another. The distribution paths can comprise further electrical components to be able to provide the desired method operations and/or traction power supply system functions. In this case, the further electrical components may be, for example, current measurement devices, voltage measurement devices, electrical isolating elements, short-circuit detection devices, a control device and/or a precharging device explained below. Over and above this, the distribution paths of the drive units can be of identical form to one another. The electrical distribution paths can comprise identical and also the same number of electrical components of the type listed above. However, provision may also be made for the distribution paths to be of a different form from one another.

Furthermore, at least one of the distribution paths can be configured to supply electrical energy to further loads aside from the drive, for example, via a subpath, a branch and/or a subdivision within the distribution path. Possible loads are, for example, an interior air-conditioning system or a charging device.

The electrical isolating elements can be designed to electrically isolate the drive units from the voltage source at least once only. However, the electrical isolating elements can be designed to isolate the drive unit and the voltage source from the voltage source in a reversible manner (that is to say to electrically connect the drive unit to the voltage source again and/or to be generally able to open and close again at least once).

A short circuit can be detected using a known short-circuit detection unit. A short circuit can be detected based on a sudden current rise within the traction power supply system. For this purpose, at least one current measurement device can be provided, for example, comprising a shunt sensor. The current measurement device can be connected to any control device of the traction power supply system and/or the control device can be configured to evaluate currents measured by the shunt sensor and, in particular, a change in the measured current over time to identify a short circuit. For example, when a corresponding change over time reaches a predetermined limit value, the presence of a short-circuit in the traction power supply system can be inferred.

Within the context of the present disclosure, a drive unit and/or a distribution path associated therewith can be identified as a possible short circuit location. A more precise spatial resolution, for example, in such a way that an electrical component in a drive unit having the short circuit and/or an associated distribution path can be identified exactly, may be beneficial but is not absolutely necessary. Instead, it may be sufficient to identify only that distribution path and/or that drive unit in which the short circuit is present.

A ready-to-drive state can be understood as a state in which the traction power supply system is fundamentally able to generate a traction force, for example, when this is required by a driver or a control unit controlling the driving operation. The ready-to-drive state therefore differs from an electrically disconnected state which, for example, for reasons of safety and in response to possible faults, all of the drive units and/or distribution paths are electrically isolated from the voltage source. Instead, the disclosure may provide maintaining an electrical connection between at least one drive unit in the voltage source via the distribution path of the drive unit and, in particular, keeping an electrical isolating element in the corresponding distribution path in a closed (that is to say current-conducting) state or setting it to this state.

One development of the method and the traction power supply system makes provision for a flow of current between the distribution paths to be detected to detect the distribution path having the short circuit and/or the drive unit having the short circuit. This generally provides the possibility of detecting the drive unit and/or the distribution path in which the short circuit is present in a particularly reliable manner. It is recognized that a substantially constant short-circuit current, the level of which is materially determined by properties of the voltage source (for example, by internal resistances of the voltage source), is present in that path in which the short circuit is present or that is connected to that drive unit that has the short circuit. In contrast, a capacitor discharge current of the capacitance(s) of the associated drive unit may be present in that path or the drive unit thereof that is not affected by the short circuit. This can be detected by a current the measurement device in the corresponding distribution path. In this case, it is understood that such a discharge current flows to the distribution path affected by the short circuit and therefore defines at least proportionally a flow of current between the distribution paths.

In this context, provision may also being made for, when the flow of current from a first distribution path to a second distribution path decreases, it is detected that the short circuit is present in the second distribution path or the drive unit connected thereto. This criterion makes it possible to reliably stipulate that the detected flow of current is a capacitor discharge current of the type described above. Therefore, is possible to reliably infer the presence of a short circuit in the corresponding the other distribution path or in the drive unit connected thereto.

One development of the method and of the traction power supply system makes provision for the electrical isolating elements in the distribution paths to initially remain in a non-isolating state when a short circuit is detected. That is to say instead of immediately electrically disconnecting the traction power supply system and, in particular, isolating the drive units from the voltage source, a certain level of debouncing can therefore be provided. In other words, an additional period (debouncing time) can be defined, in which that distribution path and/or that drive unit in which the short circuit is present can be detected. As described above and below, only that distribution path and/or that drive unit that has the short circuit can subsequently be electrically isolated. In contrast, the corresponding other distribution path or the correspondingly other drive unit can be left in a ready-to-drive state to still make it possible to generate a traction force.

A predetermined period can be defined, in which the isolating elements initially remain in a non-isolating state. The period can be, for example, several milliseconds and up to 50 ms, up to 30 ms or up to 20 ms. If the distribution path and/or drive unit in which the short circuit is present is not detected within this period, both electrical isolating elements can be set to an isolating state for reasons of safety. However, the period may be selected to be so long that the detection of the distribution path and/or the drive unit having the short circuit is successfully carried out within the period with a high likelihood. A suitable period may be identified, for example, by experimentation or via simulation and, for example, may assume the above mentioned values.

In other words, provision may thus be made for at least one (and optionally precisely one) of the electrical isolating elements to be set to an isolating state only when a predetermined minimum period has elapsed and/or the distribution path having the short circuit and/or the drive unit has been detected. As illustrated, provision may be made here for only that electrical isolating element whose distribution path and/or drive unit has the short circuit to be set to the isolating state.

In accordance with a further disclosed embodiment of the method and traction power supply system, the electrical isolating elements have a predetermined short-circuit strength. This is relevant when the electrical isolating elements initially remain in a non-isolating state in accordance with the previous disclosed embodiment. For example, the electrical short-circuit strength must be measured in such a way that a defined period of the type mentioned above can be adhered to, in which defined period the electrical isolating elements initially remain in a non-isolating state and consequently can be exposed to a possible short-circuit current during the period.

In general, contactors and/or electromagnetic relays are considered as electrical isolating elements. Semiconductor elements can also be used (for example, IGBTs or MOSFETs). Pyrotechnic isolating elements (pyrofuses) can also be provided, such as, for example, those traded under the name Pyroswitch by the company Autoliv with registered office in Stockholm (Sweden). The latter can sever the distribution paths once only and, in particular, permanently through electrical ignition of a pyrotechnic explosive charge, with the result that the drive unit coupled thereto can no longer be supplied with power by the voltage source. Combinations of such isolating elements, for example, in a common distribution path, can also be provided.

In accordance with at least one disclosed embodiment, each distribution path comprises an electromechanical relay and a pyrotechnic isolating element connected in series therewith. The electromechanical relay remains closed after the detection of a short-circuit, for example, during the defined period illustrated above and the pyrotechnic isolating element triggers only in that distribution path in which or in the associated drive unit thereof in which the short circuit is detected.

If a semiconductor component is provided as an electronic isolating element, the embodiment explained below may, however, be preferred, in which the electrical isolating elements are opened substantially immediately when the short-circuit is detected. If exclusively electromechanical relays are provided as electrical isolating elements, it may be preferred to additionally provide a fusible link, in particular, when the relays are intended to initially remain in a closed state when a short circuit is detected.

In accordance with at least one disclosed embodiment of the method and traction power supply system, electrical precharging of at least one electrical component of the drive unit is activated to detect the distribution path having the short circuit and/or the drive unit having the short circuit. For this purpose, the distribution path (and optionally each distribution path) can comprise an electrical precharging device. The precharging device can also be referred to as a precharging circuit. In general, the precharging device can be configured to precharge a (or all) possible capacitance(s) of a drive unit associated with the distribution path. The precharging device can make pulsed precharging possible. For this purpose, the precharging device can comprise an isolating element (precharging isolating element) that can be opened and closed multiple times (that is to say in a reversible manner), which can connect the drive unit and/or the capacitance provided therein, in particular, in a pulsed manner, to the voltage source and can isolate same therefrom again. The pulsed mode of operation is therefore beneficial since initially high charging currents can arise on account of a possible capacitor discharge in the event of a short circuit. The precharging device can also comprise a resistor (optionally in series with a possible electrical isolated element of the precharging device) to be able to adjust the charging current in a defined manner.

In this context, provision may also be made for, when the electrical precharging for one of the drive units (or for the at least one electrical component of the drive unit) satisfies a predetermined fault criterion, it to be detected that the drive unit and/or the distribution path thereof has the short circuit. For example, an absence of the electrical precharging of the at least one component of the drive unit (or generally of the capacitance of the drive unit) can be defined as fault criterion. This can be checked based on voltage measurements which are intended to indicate an increasing voltage within the drive unit in the case of successful precharging. For this purpose, recourse can be made to typically already present voltage measurement devices and the signals thereof or else a separate voltage measurement device can be provided, in particular, within a respective drive unit. If, for example, increasing voltage is not determined, this indicates that the precharging currents fed in do not result in charging of the capacitance of the drive unit on account of the short circuit. A change in the voltage over time can be considered as a fault criterion. If the change in voltage over time does not reach a prescribed minimum value, it can be inferred that the precharging has not been successful.

Provision may also be made in connection with a possible precharging of the drive units, when a short-circuit is detected, for the isolating elements to be initially (optionally immediately) set to an isolating state and only that isolating element belonging to the short-circuit-free distribution path to be set back to a non-isolating state. This may be provided when electrical isolating elements having a low short-circuit strength are used, for example, electrical isolating elements, such as semiconductor elements. Immediately setting to an isolating state prevents the isolating elements from being exposed to a high short-circuit current and thereby being damaged in some circumstances. To prevent an abrupt drop in the speed of the transportation vehicle in this case, provision may be made for the traction power supply system or at least the drive units to be operated in what is known as a freewheeling mode. In general, in the freewheeling mode, provision may be made for no targeted flow of current to the electric machines to be generated, however it is made possible for the electric machines to feed current back into the traction power supply system.

In general, provision may be made for the isolating elements of the distribution paths to be different from one another (also referred to as mixed form in the following text). For example, one of the distribution paths can have an isolating element that can be opened in a reversible manner and the other distribution path can have an isolating element that can be opened only once or permanently.

In accordance with at least one disclosed embodiment, (only) one of the isolating elements is set to an isolating state, optionally immediately after a short circuit has been detected, and any subsequent change in current within the traction power supply system is detected to detect the distribution path having the short circuit and/or the drive unit. The disclosed embodiment may be based on the mixed form mentioned above and the opened isolating element may be the isolating element that can be opened in a reversible manner. In the event of optional subdistribution systems within the distribution paths, provision may be made for the isolating element set to the isolating state to be provided in that distribution path that supplies a greater number of electrical loads compared to the further distribution path by subdistribution.

When a current decrease to a predetermined minimum degree (for example, by at most 50%) is detected as a change in current, it can be concluded that the short circuit is present in that distribution path and/or the drive unit connected thereto that has the isolating element set to the isolating state. The isolating element can subsequently remain in the isolating or open state to electrically disconnect the part of the traction power supply system affected by the short circuit.

In contrast, when a current decrease not to a predetermined minimum degree is detected as a change in current, it can be concluded that the short circuit is present in that distribution path and/or the drive unit connected thereto that does not have the isolating element set to the isolating state. In this case, the isolating element set initially to the isolating state can be closed again to ensure the provision of a traction force by the drive unit connected thereto. Instead, that isolating element that initially remains in the non-isolating state can be opened. In the case of the mixed form mentioned above, this isolating element may be the isolating element that can be opened only once.

The disclosed embodiments also relate to a traction power supply system for an electrically driven transportation vehicle having a voltage source; at least two electrical drive units connected to the voltage source via respective electrical distribution paths; at least one electrical isolating element in each of the distribution paths for selective isolation of the drive unit of the voltage source associated with a respective distribution path; a control device, which is configured to detect in which distribution path and/or in which drive unit a short circuit is present; wherein the traction power supply system can be operated in a ready-to-drive state after the detection of a short circuit, in which only that drive unit in which or in the distribution path of which the short circuit is present is isolated from the voltage source.

The traction power supply system can comprise any development and any further feature to provide or execute all of the above or below operations, operating states and functions. Any developments and options of the identical method features can also be provided in the traction power supply system. The traction power supply system can generally also be configured to execute a method in accordance with any of the above or below facets. The control device can prompt or carry out any of the measures illustrated above or below to detect in which distribution path and/or which drive unit a short circuit is present.

FIG. 1 shows an electrical traction power supply system 10 in accordance with a first exemplary embodiment, which executes a method in accordance with a first disclosed embodiment. In general, the traction power supply system 10 is provided to be installed in a transportation vehicle (not illustrated) and to generate at least proportionally a traction force for the transportation vehicle.

The traction power supply system 10 comprises a voltage source 12, such as a high-voltage transportation vehicle battery. The traction power supply system 10 also comprises a distributor 14, which can optionally also be integrated into the battery 12 or be formed together with same as a single module (that is to say can be combined in a structural manner with the battery 12). The traction power supply system 10 also comprises a first drive unit 16 and a second drive unit 18, which are in each case of identical form to one another. The first and second drive unit 16, 18 are each configured to generate a traction force for the transportation vehicle.

The distributor 14 comprises two electrical distribution paths 20, 22. A first electrical distribution path 20 is provided to electrically conductively connect the first electrical drive unit 16 to the voltage source 12, but also to electrically isolate the drive unit 16 from the radiation source 12 in a selective manner. The second electrical distribution path 22 is configured to electrically conductively connect the second electrical drive unit 18 to the voltage source 12, but also to electrically isolate the drive unit 18 from the radiation source 12 in a selective manner.

Each distribution path 20, 22 comprises a precharging device 24, which in turn comprises a resistor 26 and an electrical isolating element (precharging isolating element) 28 that can be activated multiple times (that is to say in a reversible manner) connected in series with the resistor. The precharging isolating element 28 of each precharging device 24 is generally open and is closed only in the context of a precharging operation, as explained in more detail below.

Each distribution path 20, 22 also comprises an electrical (main) isolating element 30, which is configured to electrically conductively connect a respective associated rive unit 16, 18 to the voltage source 12 or to isolate the drive unit therefrom. The functions of the precharging device 24 that are explained below could also be provided by way of semiconductor elements, which may be integrated into the isolating element 30 in a structural manner.

A control device 32, such as a microcontroller, can also be seen. The control device is connected in a signal-transmitting manner to each electrical isolating element 30 of the distribution paths 20, 22, in particular, in such a way that the control device 32 can permit selective opening and closing of the isolating elements 30. Each distribution path 20, 22 also comprises a current measurement device 34, for example, as a shunt sensor. The current measurement devices 34 are also connected in a signal-transmitting manner to the control device 32 and transmit measurement signals with respect to the measured current to the control device. In the embodiment shown, the current measurement devices 34 are each positioned upstream of the electrical isolating elements 30 and precharging devices 24 (that is to say between the voltage source 12 and the precharging device 24 and the isolating elements 30). The current measurement devices 34 also each measure the current in a string of the distribution paths 20, 22, the string being coupled to the positive potential of the voltage source 12.

Finally, FIG. 1 shows that each of the drive units 16, 18 has a capacitance 36 denoted by CX, which can be composed of a plurality of capacitances defined in the individual electrical components of the drive units 16, 18. A resistor 38 denoted by RLoad is also shown, which can likewise be defined by the electrical components of the drive units 16, 18 and, in particular, by the windings of an electrical drive machine (not illustrated separately) in the drive units 16, 18.

Provision may be made for each of the drive units 16, 18 to comprise exactly one electrical drive machine for generating a traction force. It is also optional that only two redundantly operable drive units 16, 18, which are supplied with power by a joint voltage source 12, are provided.

In the exemplary embodiment of FIG. 1, provision is made for short-circuit detection for example, as a sudden change in current and, in particular, an increase in current to be detected. This can be effected, for example, by way of one of the current measurement devices 34 or else a separate current measurement device in the traction power supply system 10. If a short circuit has been detected, the electrical isolating elements 30 are opened immediately. Here, in the present case, the electrical isolating elements are electrical isolating elements 30 in the form of semiconductor elements, which have a comparatively short short-circuit strength of a few milliseconds or else tenths of milliseconds. Due to immediate opening, the components are protected against permanent damage as a result of the at least temporarily very high short-circuit currents.

The control device 32 can subsequently set the drive units 16, 18 to a freewheeling operating mode to prevent abrupt losses of speed of the transportation vehicle. The control device can also (optionally immediately after the detection of the short circuit) prompt the precharging devices 24 connected in parallel with the isolating elements 30 to carry out precharging of the drive units 16, 18 or the capacitances 36 installed there by a signal-transmitting connection (not illustrated).

As a result of the fact that a short circuit has been detected, it is to be assumed that at least one of the capacitances 36 in the two drive units 16, 18 has discharged completely. In response to the high initial charging currents to therefore be expected in at least one of the capacitances 36, provision is made for the precharging devices 24 (at least when these are realized by semiconductor elements) to be operated in a pulsed operation, that is to say for the precharging isolating elements 28 (all semiconductor elements functioning as precharging isolating elements) to be opened and closed multiple times shortly one after the other. The use of precharging devices 24 and of a possible pulsed operation thereof for charging capacitances 36 is generally known in the prior art. However, the disclosed embodiments are characterized by activating such a precharging operation in response to a short-circuit detection and, in particular, activating the precharging operation to identify that distribution path 20, 22 and/or that drive unit 16, 18 in which the short circuit is present.

More precisely, when a precharging operation is activated by the control device 32, voltage measurements in the respective distribution paths 20, 22 and/or the drive units 16, 18 are also carried out and these results are transmitted to the control device 32. For this purpose, recourse can be made to already present voltage measurement devices within the traction power supply system 10 (not illustrated). The control device 32 can subsequently detect, in particular, based on a change in the measured voltage over time, whether or not the capacitance 36 in the drive units 16, 18 are precharged to a desired extent. If, for example, no voltage increase above a predetermined limit value (and, in particular, no change in voltage over time or changing voltage rate above a predetermined limit value) is determined, a fault criterion is satisfied and it is concluded that the capacitance 36 affected by the corresponding voltage measurement is not precharged. The control device 32 subsequently identifies that drive unit 16, 18 that comprises the capacitance 36 with the absent voltage rise (or that distribution path 20, 22 that belongs to the drive unit 16, 18) as affected by the short circuit.

In the unlikely case that a short circuit is identified in this manner in both drive units 16, 18, both electrical isolating elements 30 remain in an open state. In the clearly more likely case that only one short circuit is detected in one of the drive units 16, 18 (and/or the associated distribution paths 20, 22), in contrast, only that electrical isolating element 30 whose drive unit 16, 18 or distribution paths 20, 22 is not affected by the short circuit is closed again. For example, when a short circuit is detected for the first drive unit 16/or the distribution path 20 thereof, the electrical isolating element 30 there would be left in an open and therefore isolating state, whereas the electrical isolating element 30 in the second distribution path 22 that supplies power to the second electrical drive unit 18 would be closed again and therefore assumes a non-isolating state. This leads to the region of the traction power supply system 10, which region is in the form of the first distribution path 20 and first drive unit 16 and is affected by the short circuit, being electrically disconnected whereas the region or proportion in the form of the second distribution path 22 and the second drive unit 18 and not affected by the short circuit continues to be electrically conductively connected to the voltage source 12. Therefore, at least the proportion of the traction power supply system 10 again assumes a ready-to-drive state and is generally configured to generate a traction force for moving the transportation vehicle forward.

Figure 2:
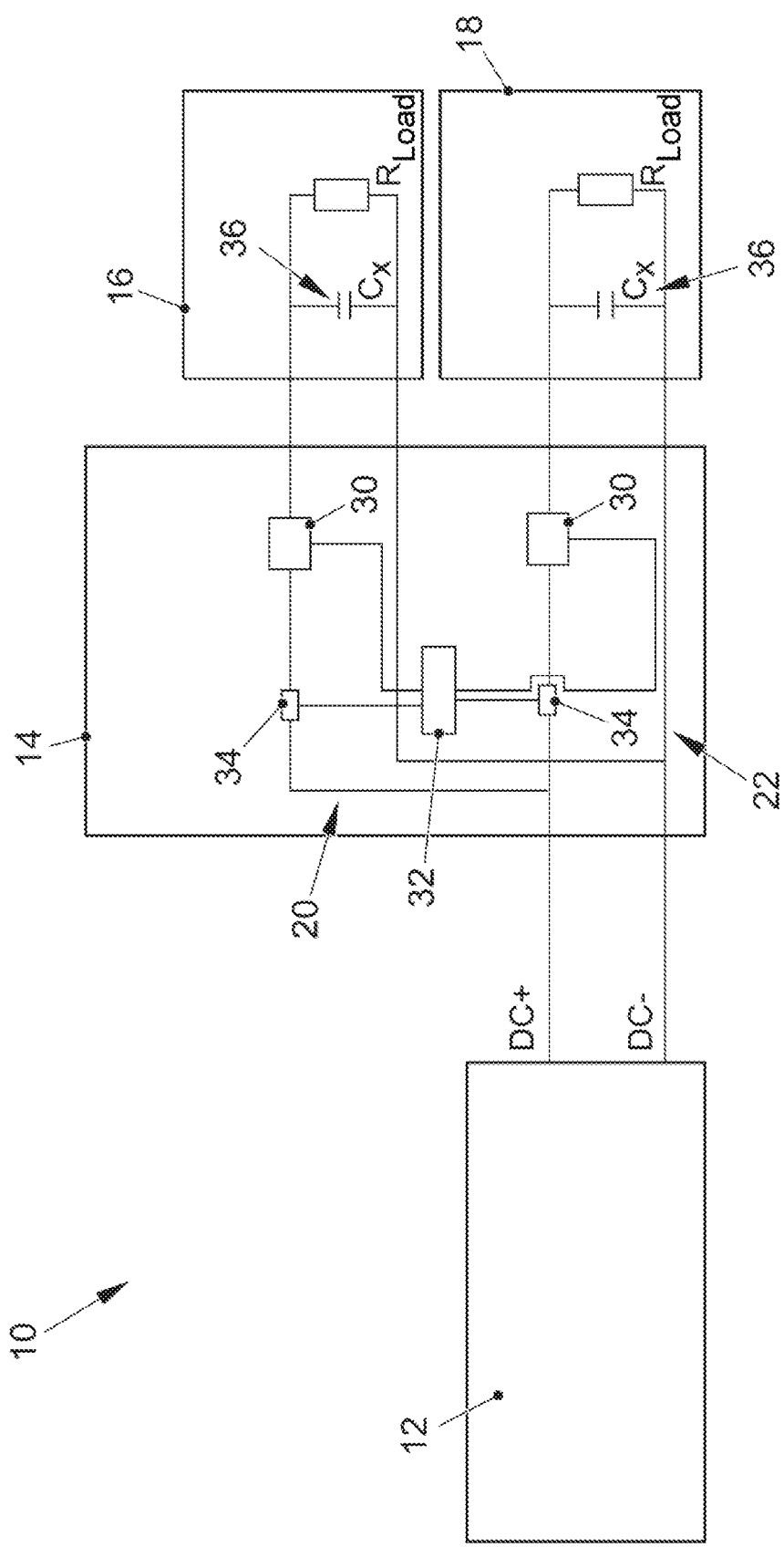
FIG. 2 shows a schematic illustration of a traction power supply system in accordance with a second exemplary embodiment, which executes a disclosed method in accordance with a second embodiment.

FIG. 2 shows a second disclosed embodiment of a traction power supply system 10, which executes a disclosed method in accordance with a second option. The traction power supply system 10 differs from the option explained above with respect to the distributor 14. Shown in detail are in turn a voltage source 12 for supplying power to the first and second drive units 16, 18, which are basically of identical form to the embodiment from FIG. 1 depicted above. The distributor 14 comprises a first and second electrical distribution path 20, 22 to connect the drive units 16, 18 to the voltage source 12. The distributor 14 also comprises a control device 32, which is connected to current measurement devices 34 in each of the distribution paths 20, 22.

However, the distribution paths 20, 22 do not comprise any precharging devices 24 as in the embodiment of FIG. 1. However, they still comprise electrical isolating elements 30, which are each connected to the control device 32. In the second exemplary embodiment, the isolating elements 30 are not, however, formed as semiconductor elements. Instead, they are formed as pyrotechnic isolating elements and are generally configured, after receiving a corresponding indication from the control device 32, to permanently interrupt an electrical connection of a drive unit 16, 18, which is connected to the corresponding distribution path 20, 22, and the voltage source 12 (for example, by mechanically severing at least one electrical conductor in the distribution paths 20, 22). On the other hand, the electrical isolating elements 30 in the shown case have, however, a comparatively high short-circuit strength and are configured, in particular, to withstand short-circuit currents over several milliseconds, in particular, several 10 ms and, for example, at least 20 ms.

In accordance with the second exemplary embodiment, the traction power supply system 10 is therefore operated in such a way that the electrical isolating elements 30 initially remain in a closed (that is to say current-conducting) state when a short circuit is detected. In this case, the short circuit can be detected in a manner analogous to the embodiment from FIG. 1. However, being left in the closed state makes it possible to prevent an abrupt drop in speed of the transportation vehicle. Instead, the distribution paths 20, 22 or the drive units 16, 18 in which the short circuit is present is first identified via the current measurement devices 34 in the distribution paths 20, 22 or the evaluation of the signals thereof by way of the control device 32. This takes place in such a way that a distinction is made between the fault case of a short-circuit in the distribution paths 20, 22 or drive units 16, 18 and a short-circuit-free state based on previously stored characteristic curves.

More precisely, it is recognized that, when a short circuit is present in all of the distribution paths 20, 22 or the associated drive unit 16, 18, a substantially constant high short-circuit current is present, the level of which is primarily determined by the inner resistances of the voltage source 12. In that distribution path 20, 22 or the associated drive unit 16, 18 that does not have the short circuit, a discharge current of the capacitance 36 of the corresponding drive unit 16, 18 is initially present at least immediately after the occurrence of the short circuit. The discharge current can be described by way of a corresponding characteristic curve, with the result that the control device 32 can determine in which drive unit 16, 18 or else associated distribution path 20, 22 the discharge current and therefore no short circuit is currently present from a comparison of the current present immediately upon short-circuit detection (or else the change in current over time) in the distribution paths 20, 22 using just the characteristic curve. For this distribution path 20, 22, provision can be made for the isolating element 30 to be left in a closed state. On the other hand, the pyrotechnic severing of the distribution path 20, 22 by the control device 32 can be activated in that isolating element 30 that belongs to the other distribution path 20, 22 that is therefore affected by the short circuit. As a result, this again leads to the drive unit 16 (or the associated distribution path 20, 22 thereof) affected by the short circuit being permanently electrically disconnected, whereas the drive unit 18 (or the associated distribution path 22 thereof) not having the short circuit continuing to be able to be operated to generate a traction force.

Finally, it should be noted that the provision of current measurement devices 34 in each of the distribution paths 20, 22 can also be used for further diagnosis purposes. The control device 32 can check the plausibility of measurement signals of other sensors within the distribution paths 20, 22 or else the drive units 16, 18. In addition or as an alternative, the amounts of electrical energy of the respective drive units 16, 18 recorded over a predetermined time interval can be determined and compared with one another for the purpose of fault diagnosis.

Not illustrated in the figures is the fact that in each case at least one of the distribution paths 20, 22 can also comprise a subdistribution system for supplying power to further loads (for example, for the compressor of an interior air-conditioning system). An isolating element 30 of such a distribution path 20, 22 may be positioned in such a way that it is positioned between the voltage source 12 and the subdistribution system to also be able to detect and disconnect short circuits in the subdistribution system of the distribution path 20, 22.

Also not shown is a further exemplary embodiment that illustrates a mixed form of the distribution path embodiments of FIGS. 1 and 2. More precisely, in this case, a first distribution path 20 can be formed in accordance with the embodiment of FIG. 1 (that is to say having an isolating element 30 that can be opened in a reversible manner or, more precisely, that can be opened and closed in a reversible manner) and a second distribution path 20 can be formed in accordance with the embodiment of FIG. 2 (that is to say having an isolating element 30 that can be isolated or opened permanently and only once). In this case, it is optional that the distribution path 20 that supplies power to a larger number of loads, for example, via an optional subdistribution system is formed with the isolating element 30 that can be opened in a reversible manner.

In this case, a short circuit can be detected by a current measurement device 34 within the traction power supply system 10 or in one of the distribution paths 20, 22, wherein the current measurement device can be the only current measurement device 34 of the traction power supply system 10. If this takes place, the isolating element 30, which can be opened in a reversible manner, of the first distribution path 20 is opened immediately. Subsequently, the same current measurement device 34 optionally monitors to determine whether a current drop within the traction power supply system 10 occurs. If this is the case, it can be concluded that the first distribution path 20 (or an optional subdistribution system comprised thereby) has the short circuit. The isolating element 30 can subsequently remain in an open state. In contrast, if no current drop is determined, it can be concluded that the short circuit is present in the other distribution path 22 that comprises the isolating element 30 that can be opened only once. The isolating element can remain closed at least until the current measurement has been carried out on account of the high short-circuit strength of the isolating element. Subsequently, for example, the pyrotechnic, isolating element 30 can be opened once only and remain in the open state to electrically disconnect the distribution path 22.

In this option, using a comparatively low detection outlay, the short circuit detection can take place reliably and (for example, on account of the just one current measurement device 34) at low costs.

LIST OF REFERENCE SYMBOLS

10 Traction power supply system
12 Voltage source
14 Distributor
16, 18 Drive unit
20, 22 Distribution path
24 Precharging device
26 Resistor
28 Precharging isolating element
30 Isolating element
32 Control device
34 Current measurement device
36 Capacitance
38 Resistor

The invention claimed is:

1. A traction power supply system for an electrically-driven transportation vehicle powered by voltage, the system comprising:
- a voltage source for powering the electrically-driven transportation vehicle;
- at least two electrical drive units connected to the voltage source via respective electrical distribution paths;
- at least one electrical isolating element in each of the electrical distribution paths for selective isolation of the respective electrical drive unit and the respective electrical distribution path from the voltage source; and
- a controller configured to detect in which electrical distribution path and/or in which electrical drive unit a short circuit is present based on detection of current flow between the at least two electrical distribution paths and, in response to the detection of the current flow, electrically precharging at least one electrical drive unit component, measuring voltages in the at least two electrical distribution paths, and determining a voltage level of a corresponding capacitance in the respective electrical distribution path to determine the electrical distribution path and/or the electrical drive unit having the short circuit, wherein, after the short circuit detection, the controller controls the traction power supply system to be operated in a ready-to-drive state in which the voltage source is isolated from only the electrical drive unit or the electrical distribution path determined to have the short circuit.

2. The system of claim 1, wherein, in response to decreasing the current flow from a first electrical distribution path to a second electrical distribution path of the at least two electrical distribution paths, it is detected whether the short circuit is present in the second electrical distribution path or the electrical drive unit connected thereto the second electrical distribution path.

3. The system of claim 1, wherein the electrical isolating elements in the electrical distribution paths initially remain in a non-isolating state when the short circuit is detected.

4. The system of claim 3, wherein at least one of the electrical isolating elements is set to an isolating state only when a predetermined minimum period has elapsed and/or the electrical distribution path having the short circuit and/or the electrical drive unit having the short circuit is detected.

5. The system of claim 4, wherein the electrical isolating elements have a predetermined short-circuit strength.

6. The system of claim 1, wherein, in response to the electrical precharging for one of the electrical drive units satisfying a predetermined fault criterion, it is detected that the precharged electrical drive unit and/or the electrical distribution path thereof has the short circuit.

7. The system of claim 1, wherein, in response to the short circuit detection, the electrical isolating elements are initially set to an isolating state and only the electrical isolating element belonging to a short-circuit-free electrical distribution path is set back to a non-isolating state.

8. The system of claim 7, wherein, in response to detection of a current decreasing to a predetermined minimum degree, the short circuit is determined to be present in that electrical distribution path and/or the electrical drive unit connected thereto that has the electrical isolating element; and/or wherein, in response to detection of the current not decreasing to a predetermined minimum degree, the short circuit is determined to be present in the electrical distribution path and/or the electrical drive unit connected thereto that does not have the electrical isolating element.

9. The system of claim 1, wherein: one of the electrical isolating elements is set to an isolating state; and detection of the electrical distribution path having the short circuit and/or the electrical drive unit having the short circuit is determined based on any subsequent change in current within the traction power supply system.

10. A method for operating a traction power supply system of an electrically-driven transportation vehicle powered by voltage, wherein the traction power supply system includes a voltage source for powering the electrically-driven transportation vehicle and at least two electric drive units connected to the voltage source via respective electrical distribution paths, and wherein at least one electrical isolating element is provided in each of the electrical distribution paths for selective isolation of the electrical drive unit and the respective electrical distribution path from the voltage source, the method comprising: in which electrical distribution path and/or in which electrical drive unit a short circuit is present based on detection of current flow between the at least two electrical distribution paths and, in response to the detection of the current flow, electrically precharging at least one electrical drive unit component, measuring voltages in the at least two electrical distribution paths, and determining a voltage level of a corresponding capacitance of the respective electrical distribution path to determine the electrical distribution path and/or the electrical drive unit having the short circuit; and in response to the short circuit detection, controlling operation of the traction power supply system to be in a ready-to-drive state in which the voltage source is isolated from only the electrical drive unit or the electrical distribution path determined to have the short circuit.

11. The method of claim 10 wherein, in response to the current flow from a first electrical distribution path to a second electrical distribution path decreasing, it is detected that the short circuit is present in the second electrical distribution path or the electrical drive unit connected thereto the second electrical distribution path.

12. The method of claim 10, wherein the electrical isolating elements in the electrical distribution paths initially remain in a non-isolating state when the short circuit is detected.

13. The method of claim 12, wherein at least one of the electrical isolating elements is set to an isolating state only when a predetermined minimum period has elapsed and/or the electrical distribution path having the short circuit and/or the electrical drive unit having the short circuit is detected.

14. The method of claim 13, wherein the electrical isolating elements have a predetermined short-circuit strength.

15. The method of claim 10, wherein, in response to the electrical precharging for one of the electrical drive units satisfying a predetermined fault criterion, it is detected that the precharged electrical drive unit and/or the electrical distribution path thereof has the short circuit.

16. The method of claim 10, wherein, in response to the short-circuit detection, the electrical isolating elements are initially set to an isolating state and only that electrical isolating element belonging to a short-circuit-free electrical distribution path is set back to a non-isolating state.

17. The method of claim 16,
wherein, in response to detection of a current decreasing to a predetermined minimum degree, the short circuit is determined to be the short circuit is present in that electrical distribution path and/or the electrical drive unit connected thereto that has the electrical isolating element; and/or wherein, in response to detection of a current not decreasing to a predetermined minimum degree, the short circuit is determined to be the short circuit is present in that electrical distribution path and/or the electrical drive unit connected thereto that does not have the isolating element.

18. The method of claim 10, wherein: one of the electrical isolating elements is set to an isolating state; and detection of the electrical distribution path having the short circuit and/or the electrical drive unit having the short circuit is determined based on any subsequent change in current within the traction power supply system.

* * * * *